(12) United States Patent
Mikheev et al.

(10) Patent No.: US 10,250,584 B2
(45) Date of Patent: Apr. 2, 2019

(54) SYSTEM AND METHOD FOR SINGLE SIGN-ON TECHNICAL SUPPORT ACCESS TO TENANT ACCOUNTS AND DATA IN A MULTI-TENANT PLATFORM

(71) Applicant: Zuora, Inc., San Mateo, CA (US)

(72) Inventors: Oleg Mikheev, Belmont, CA (US); Joshy Austin, Fremont, CA (US); Pushkala Pattabhiraman, Fremont, CA (US); Levon Stepanian, Redwood City, CA (US); Pritesh Parekh, Fremont, CA (US)

(73) Assignee: Zuora, Inc., San Mateo, CA (US)

( * ) Notice: Subject to any disclaimer, the term of this patent is extended or adjusted under 35 U.S.C. 154(b) by 0 days.

(21) Appl. No.: 14/884,492

(22) Filed: Oct. 15, 2015

(65) Prior Publication Data

US 2016/0134619 A1    May 12, 2016

Related U.S. Application Data

(60) Provisional application No. 62/064,348, filed on Oct. 15, 2014.

(51) Int. Cl.
*G06F 21/41* (2013.01)
*H04L 29/06* (2006.01)
*H04L 29/08* (2006.01)
*H04W 4/60* (2018.01)

(52) U.S. Cl.
CPC .......... *H04L 63/0815* (2013.01); *G06F 21/41* (2013.01); *H04L 63/0884* (2013.01); *H04L 67/10* (2013.01); *H04W 4/60* (2018.02)

(58) Field of Classification Search
CPC .............................. G06F 21/41; H04L 63/0815
See application file for complete search history.

(56) References Cited

U.S. PATENT DOCUMENTS

| | | | |
|---|---|---|---|
| 2012/0096271 A1* | 4/2012 | Ramarathinam | ... H04L 63/0807 713/172 |
| 2012/0096521 A1* | 4/2012 | Peddada | ............... G06F 21/629 726/4 |
| 2012/0297472 A1* | 11/2012 | Tamura | ............... H04L 63/0815 726/8 |

(Continued)

*Primary Examiner* — Jason Chiang
(74) *Attorney, Agent, or Firm* — Sheppard, Mullin, Richter & Hampton LLP

(57) ABSTRACT

Shown is single sign-on support access to tenant accounts in a multi-tenant service platform involving a proxy user account in an identity provider for a tenant account on the service platform having security metadata associated therewith, mapping in the identity provider maps a support user to a proxy user identifier, a corresponding security endpoint in the service platform and mapping of the proxy user account identifier to the tenant account and security metadata. The identity provider authenticates a request to access the tenant account on the service platform, obtains the security credentials for the proxy user identifier, and sends a security assertion with the proxy user identifier and the security metadata to the security endpoint. The endpoint receives and validates the security assertion against the mapping for the proxy user identifier to the tenant account and the security metadata in the service platform, and permits access by the support user to the tenant account in the service platform.

18 Claims, 10 Drawing Sheets

(56) References Cited

U.S. PATENT DOCUMENTS

| | | | | |
|---|---|---|---|---|
| 2013/0091171 A1* | 4/2013 | Lee | ............ | G06F 21/41 |
| | | | | 707/784 |
| 2013/0091547 A1* | 4/2013 | Venkatesh | ............ | G06F 7/00 |
| | | | | 726/4 |
| 2013/0326608 A1* | 12/2013 | Uchida | ............ | H04L 63/0815 |
| | | | | 726/8 |
| 2013/0340062 A1* | 12/2013 | Kobayashi | ............ | H04L 63/0815 |
| | | | | 726/8 |
| 2014/0245389 A1* | 8/2014 | Oberheide | ............ | H04L 63/0815 |
| | | | | 726/3 |

* cited by examiner

SYSTEM AND METHOD FOR SINGLE SIGN-ON TECHNICAL SUPPORT ACCESS TO TENANT ACCOUNTS AND DATA IN A MULTI-TENANT PLATFORM

CROSS REFERENCE TO RELATED APPLICATIONS

This application claims the benefit of U.S. Provisional Patent Appl. No. 62/064,348 for "Single Sign-on Access to Tenant Accounts and Data in a Multi-Tenant Platform" filed Oct. 15, 2014, herein incorporated by reference in its entirety for all purposes.

BACKGROUND

A multi-tenant computing platform may be operated by a service provider to provide support for cloud-based processing, data storage and business oriented applications to multiple tenants. As part of operating the platform, asynchronous messages are typically received by the multi-tenant platform from the multiple tenants that are generally processed in the order that the messages are received or using resources that are previously assigned to each tenant. Such asynchronous message systems typically operate in a stateless manner.

A multi-tenant platform may be operated by a service provider to provide cloud-based data storage and business oriented applications to multiple users or groups of users. As part of operating the platform, the service provider's technical support representatives may need to access the account, data, or applications being used by a tenant to investigate and correct a problem.

One way to provide this access is to create an individual local account for the technical support representative that provides them with access to the tenant's account. While effective, this is time consuming and may require the creation of multiple new accounts in the situation where more than a single technical support representative is needed to diagnose or resolve a problem. Furthermore, this approach requires the administration of additional accounts which may be temporary, and which require time and effort to create.

Conventional approaches to providing a multi-tenant service provider's technical support or customer service representatives with access to a tenant's account have disadvantages that cause such approaches to be undesirable. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments are directed to systems, apparatuses, media and methods for enabling effective and efficient technical support access to a tenant's account, applications, and data by a service provider's technical support or customer service representatives. In one example, the present approach utilizes a form of single sign-on (SSO) technology to enable access to a tenant application in a multi-tenant architecture, such as a Software-as-a-Service (SaaS) platform, without creating individual local accounts on the platform that are associated with the tenant account.

In one example, single sign-on support access to tenant accounts in a multi-tenant service platform involves providing a proxy user account in an identity provider module for at least one tenant account on the service platform, the proxy user account having security metadata associated therewith in the identity provider module. It also involves providing a mapping in the identity provider module that maps at least one support user account to an identifier for the proxy user account and providing a security endpoint module in the service platform that corresponds to the identity provider module and a mapping that maps the identifier for the proxy user account to the tenant account and the security metadata. Operation in the identity provider module also involves receiving from the support user account a request to access the tenant account on the service platform, authenticating a security context of the support user account, obtaining the security credentials for the proxy user account, and sending a security assertion with an identifier for the proxy user account and the security metadata to the security endpoint. Operation in the security endpoint module also involves receiving the security assertion, validating the identifier and security metadata in the security assertion against the mapping for the proxy user account to the tenant account and the security metadata in the service platform, and, if the validation is successful, permitting access by the support user to the tenant account in the service platform.

In a further refinement of this example, the mapping in the identity provider module further maps an other support user account to the identifier for the proxy user account. The operation of the identity provider module further involves receiving from the other support user account a request to access the tenant account on the service platform, authenticating a security context of the other support user account, obtaining the security credentials for the proxy user account, and sending an other security assertion with an identifier for the proxy user account and the security metadata to the security endpoint. Operation in the security endpoint module further involves receiving the other security assertion, validating the identifier and security metadata in the other security assertion against the mapping for the proxy user account to the tenant account and the security metadata in the service platform, and, if the validation is successful, permitting access by the other support user to the tenant account in the service platform.

Another refinement of the example involves creating the mapping in the identity provider module that maps at least one support user account to an identifier for the proxy user account and the mapping in the security endpoint module that maps the identifier for the proxy user account to the tenant account and the security metadata. This is done by determining eligible tenant accounts without mappings configured in the identity provider module and obtaining a list of support users for the tenant account configured in a configuration file of the identity provider module. For each tenant account without a mapping configured further operations create a mapping entity for the tenant account, map the created entity to the list of users for the tenant account, create a proxy user account for the tenant account with a federated identifier, map each user in the list of support users to the federated identifier, and create the security metadata for the proxy user account. A further refinement involves creating the mappings in the identity provider module and the security endpoint module in response to the addition of a tenant account or a user account.

Another refinement of the example involves, responsive to deactivation of the tenant account, disabling support access to the tenant account by removing the mapping in the identity provider module that maps at least one support user account to an identifier for the proxy user account and removing the mapping in the security endpoint that maps the identifier for the proxy user account to the tenant account and the security metadata.

Still another refinement of the example involves, responsive to deactivation of a user, the deactivated user is removed from the mapping in the identity provider module.

Other objects and advantages of the present invention will be apparent to one of ordinary skill in the art upon review of the detailed description of the present invention and the included figures.

BRIEF DESCRIPTION OF THE DRAWINGS

Embodiments or examples of the invention in accordance with the present disclosure will be described with reference to the drawings, in which.

Note that the same numbers are used throughout the disclosure and figures to reference like components and features.

DETAILED DESCRIPTION

Figure 1:
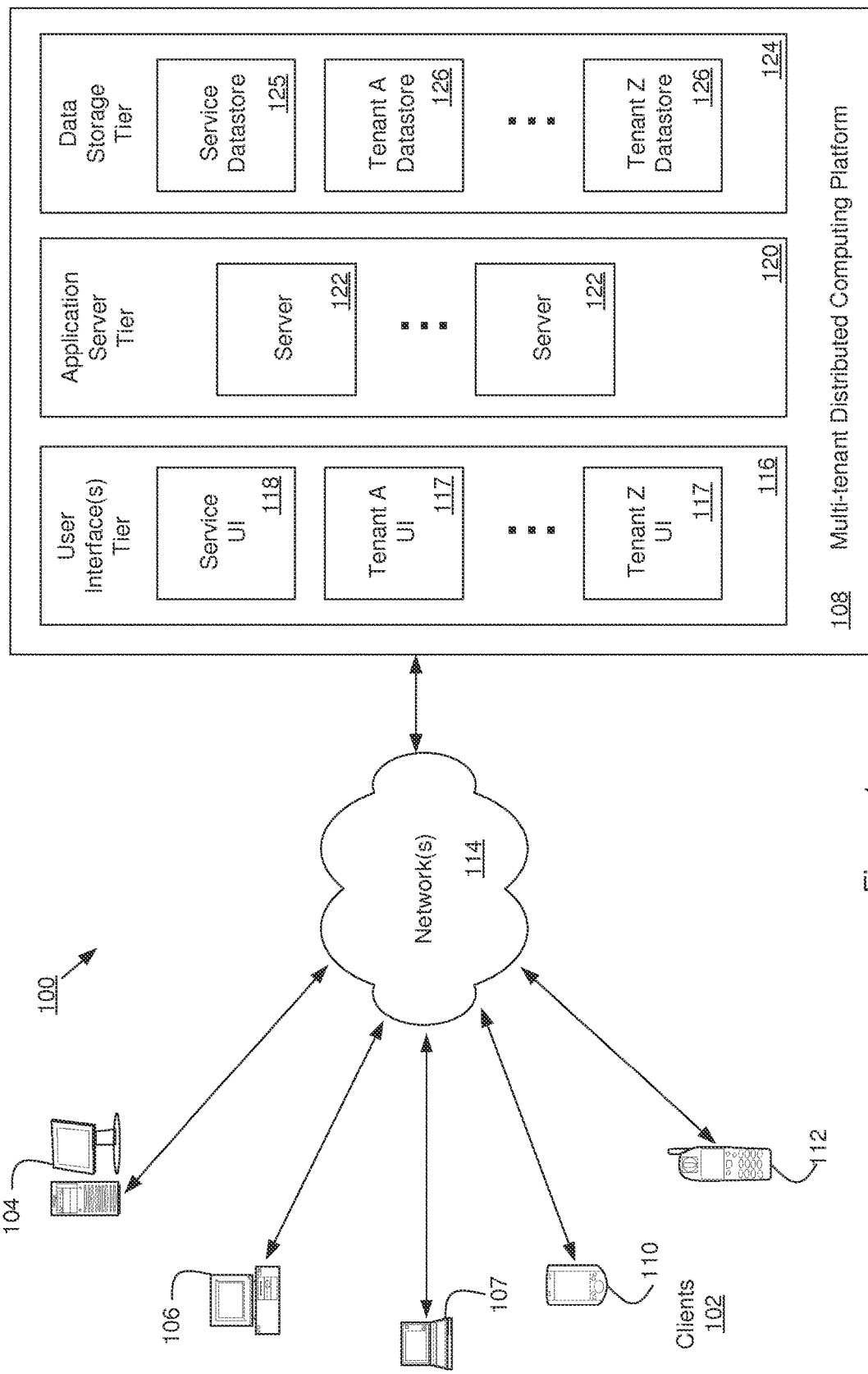
FIG. 1 is a diagram illustrating elements or components of an example operating environment (e.g., a Multi-tenant Distributed Computing Platform) with which an example of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable persistent data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the present invention are directed to systems, apparatuses, and methods for enabling a technical support or customer service representative of the operator of a multi-tenant platform to access a customer's account and associated data and applications, without the need to create an individual account associated with that customer. This permits one or more technical support representatives to individually or collectively investigate, diagnose, and implement corrections to problems encountered by the customer without creating significant additional account management overhead for the platform operator.

In one example, the invention includes a process or processes by which a multi-tenant platform operator's (such as a SaaS provider) technical support staff can access the same or different tenant accounts using a single tenant proxy user account that is maintained by the platform operator or SaaS provider. Using a standard application login method or SSO method would require a user account to be provisioned for each user for each tenant and access control permissions be configured for each user account (with the same requirements applying to production and/or sandbox environments).

In contrast, with certain examples of the invention, there is only one proxy user for all of the support employees of a platform operator, and the access for each user is controlled through configuration of the authentication process. The authentication process leverages the functions of the SSO process upon receiving triggering events, such as new tenant creation, addition of new users in the system, etc. Once a tenant or user is deactivated, e.g., in an LDAP-ActiveDirectory-Authentication Process, the present process dynamically revokes access privileges for those entities with the user/tenant mapping and any corresponding mappings on SaaS application's database.

As noted, in some examples, the invention may be implemented in the context of (or used with) a multi-tenant, "cloud" based environment (such as a multi-tenant business data processing platform), typically used to develop and provide services and business applications for end users. This exemplary implementation environment will be described with reference to FIG. 1. Note that examples of the invention may also be implemented in the context of other computing or operational environments or systems, such as for an individual business data processing system, a private network used with a plurality of client terminals, a remote or on-site data processing system, another form of client-server architecture, etc.

It is relevant to note that modern computer networks often incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, and web-based customer support, as well as reporting and analysis capabilities relating to these functions. With differing levels of overlap with ERP/CRM initiatives and with each other, efforts have also been directed toward development of increasingly integrated partner and vendor management systems, web store/eCommerce systems, product lifecycle management (PLM) systems, financial and revenue accounting systems, and supply chain management (SCM) systems.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

As it has become more common for electronic commerce and other types of clients to utilize cloud resources, such as multi-tenant systems, to support their customers or provide SaaS to users, it is important for systems supporting such users to be capable of handling high processing loads. Often, a large processing job is divided into many smaller tasks that are sometimes dependent upon a current state of the processing of the large job. For example, if the processing of a large job fails at some point, it may be useful to know the state of processing of the large job in order to reverse or restart the processing from the point of failure. Maintaining state in a complex system, such as a multi-tenant service platform or operating environment, may become challenging as the platform attempts to process multiple jobs for different tenants and users in an efficient manner using shared computing resources.

Multi-tenant platforms also face technical and customer support challenges. Generally, each tenant has separate, secure data and services that may require support. Each tenant instantiation generally requires a separate support interface in order to maintain security and segregation between tenants.

FIG. 1 is a diagram illustrating elements or components of a multi-tenant operating environment 100 in which an embodiment of the invention may be implemented. As shown, a variety of clients 102 incorporating and/or incorporated into a variety of computing devices may communicate with a distributed computing service/platform 108 through one or more networks 114. For example, a client may incorporate and/or be incorporated into a client application (e.g., software) implemented at least in part by one or more of the computing devices. Examples of suitable computing devices include personal computers, server computers 104, desktop computers 106, laptop computers 107, notebook computers, tablet computers or personal digital assistants (PDAs) 110, smart phones 112, cell phones, and consumer electronic devices incorporating one or more computing device components, such as one or more electronic processors, microprocessors, central processing units (CPU), or controllers. Examples of suitable networks 114 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 108 may include multiple processing tiers, including a user interface tier 116, an application server tier 120, and a data storage tier 124. The user interface tier 116 may maintain multiple user interfaces 117, including graphical user interfaces and/or web-based interfaces. The user interfaces may include a default user interface for the service to provide access to applications and data for a user or "tenant" of the service (depicted as "Service UI" 118 in the figure, which may also (or instead) represent a UI for use by the platform operator to configure or otherwise manage use of the platform), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant or platform operator to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 124 may include one or more data stores, which may include a Service Data store 125 and one or more Tenant Data stores 126.

Each tenant data store 126 may contain tenant-specific data that is used as part of providing a range of tenant-specific business services or functions, including but not limited to ERP, CRM, eCommerce, Human Resources management, payroll, financials, accounting functions, etc. Data stores may be implemented with any suitable data storage technology, including structured query language (SQL) based relational database management systems (RDBMS).

In accordance with one embodiment of the invention, distributed computing service/platform 108 may be multi-tenant and service platform 108 may be operated by an entity (e.g., a platform operator) in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

The integrated multi-tenant system shown in FIG. 1 may consist of multiple applications and data stores, and may be hosted on a distributed computing system made up of at least one, but likely multiple, "servers." A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
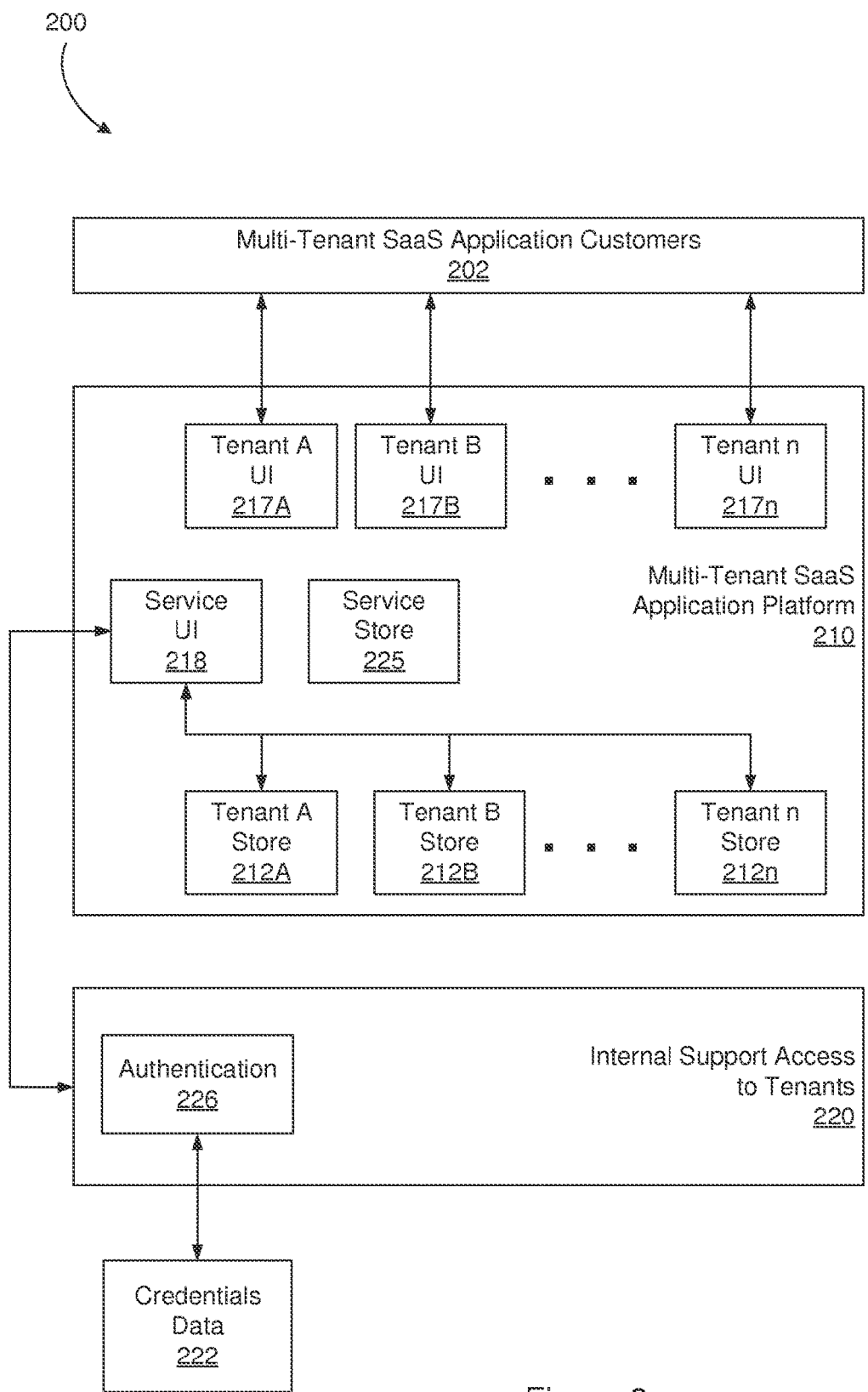
FIG. 2 is a diagram illustrating a conventional architecture for enabling a technical support representative of a multi-tenant service provider to access a tenant's account.

FIG. 2 is a block diagram illustrating a conventional architecture 200 for enabling a technician or customer service representative of a multi-tenant service provider to access a tenant's account on Multi-Tenant SaaS Application Platform 210. FIG. 2 illustrates aspects of an example multi-tenant architecture that includes the use of credentials for purposes of authenticating each user desiring access to a tenant's account. As shown in the figure, a set of user credentials 222 are stored and referred to by an authentication process 226 to permit service representatives of the platform operator to obtain access to the accounts of individual tenants (shown as "Internal Support Access to Tenants" 220) via Service UI 218. Each tenant may have access to one or more applications, which may be provided by the multi-tenant platform, typically (although not required) in a Multi-Tenant Software-as-a-Service (SaaS) application model 210 and typically has a separate Tenant Data Store 212A, 212B and 212n. The tenant's users (employees and/or customers) 202 may access the data 212A, 212B and 212n and applications resident on platform 210 remotely through Tenant User Interface 217A, 217B and 217n using a suitable client device and communications network. Data used in service and support may be maintained in Service Store 225.

The integrated multi-tenant system shown in FIG. 2 may consist of multiple applications and data stores 212A, 212B and 212n, and may be hosted on a distributed computing system made up of at least one, but likely multiple, "servers." A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 3:
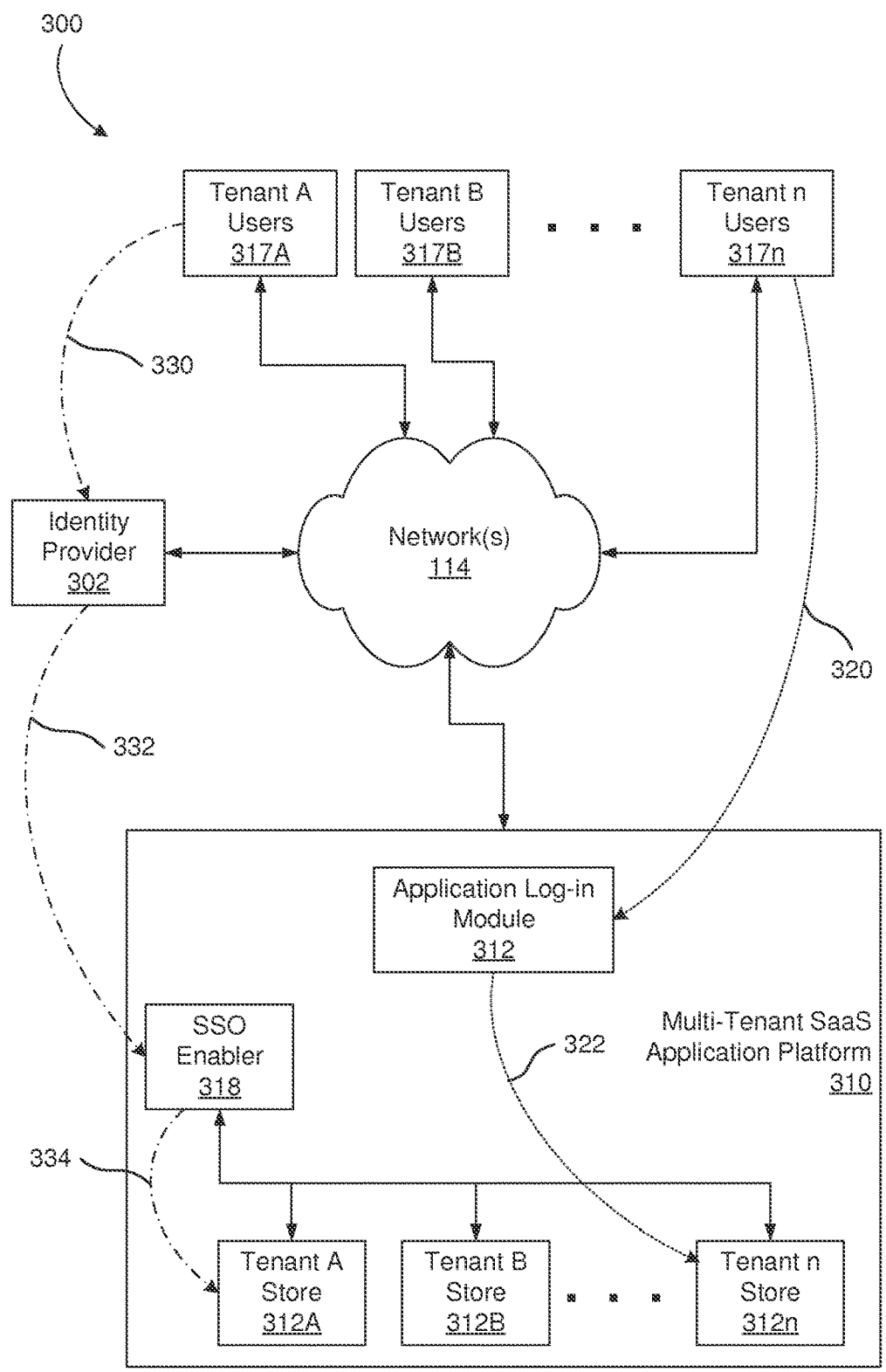
FIG. 3 is a diagram illustrating elements of an example of a conventional single-sign-on (SSO) login process, and an embodiment of the current sign-on process (referred to as "zSSO" in the figure) that may be used to enable a technical support representative of a multi-tenant service provider to access a tenant's account.

FIG. 3 is a diagram illustrating elements of examples of conventional login processes, e.g. a single-sign-on (SSO) process, according to one example in the application that may be used to enable a technical support representative of a multi-tenant service provider to access a tenant's account. The first example illustrates a conventional direct application login, wherein a technical support representative logs into the SaaS application platform using the user's credentials via Application Login Module or process 312. For example, a login request 320 is sent from a Tenant n User 317n to Application Login Module 312, which authenticates the user's credentials and authorizes access 322 to the applications and data in Tenant n Store 312n. This conventional approach requires each user to be provisioned on platform 310 as an application user with applicable access controls. Thus, each technical support representative requires their own account and credentials for each tenant, creating multiple accounts and access control data that would have to be maintained and administrated.

The second example of a conventional access approach illustrated in FIG. 3 relates to Single Sign On (SSO). In this SSO scenario, each user is provisioned on platform 310 as in the login process described above, but the authentication function is performed by an Identity Provider (IDP) module or function 302, which, in this example, receives a login request 330 from a support user account registered as a Tenant A User 317A. Once the authenticity of the support user account is established at the IDP, the IDP sends a SAML message/artifact 332 certifying the authenticity of the user to a SSO Enabler component 318 in platform 310, which verifies the content of message/artifact 332 and, if verification is successful, allows access 334 to the applications and data in Tenant A Store 312A.

Figure 4:
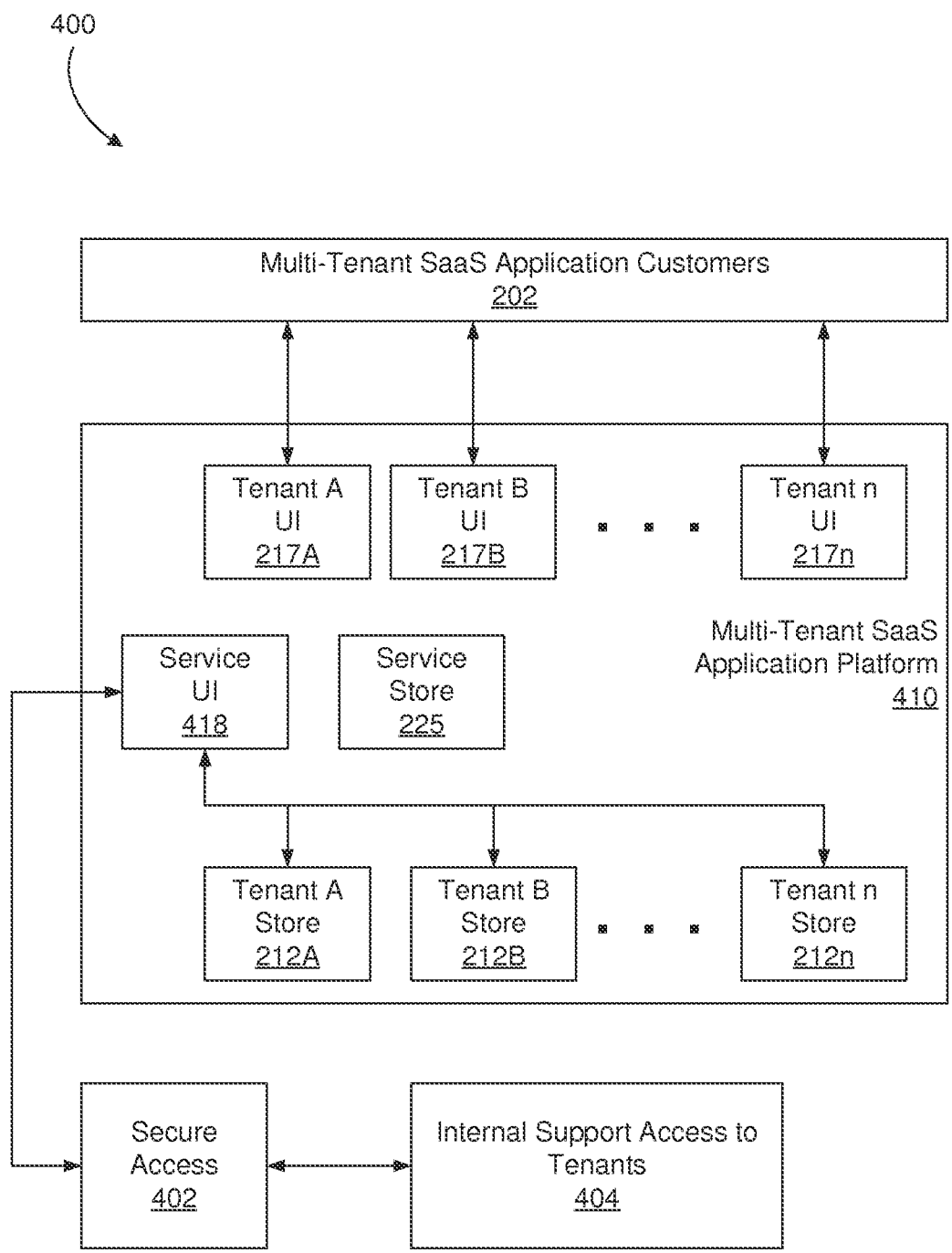
FIG. 4 is a diagram illustrating an architecture for enabling a technical support representative of a multi-tenant service provider to access a tenant's account, and that includes elements of an example of the invention.

FIG. 4 is a diagram illustrating an example of an architecture 400 for enabling a technical or customer support representative of a multi-tenant service provider to access a tenant's account on Multi-Tenant SaaS Application Platform 410. In this example, Secure Access process or function 402 provides for internal support access 404 to one or more tenant accounts through secure access 402 and secure service user interface 418 without the need to create individual tenant-level accounts and access controls for each tenant. This provides an efficient way for the customer service technicians or representatives of a multi-tenant platform 410 to be access the accounts, applications, and data of one or more tenants 217A, 217B and 217n for technical and customer support without the need to create and administer multiple tenant level accounts and access controls.

In this example, secure access element/process/function 402 does not require a username and password in order for internal users 404 to access tenant accounts. This may have one or more of the following benefits: (a) providing an increased level of security and access control, by making the access process resistant to attacks involving credential leaks and password vulnerabilities, and (b) increasing the productivity of technical support representatives both individually and collectively, by replacing the processes of maintaining a list of credentials, looking them up for a specific tenant, and physically entering a username and password on the login screen by the login approach described herein.

The present approach utilizes IDP-initiated SSO. In some examples of IDP initiated SSO, the IDP is configured with links to service providers (SPs), where these links refer to the local IDP's SSO service and pass parameters to the service that identify the remote SP. Instead of visiting the SP directly, a user accesses the IDP site and clicks a link identifying an SP in order to access the remote SP. In one example, this triggers the creation of a SAML assertion or artifact that is sent to the SP using HTTP POST binding. At some point, a user is required to supply their credentials to the IDP, e.g. logon, in order to obtain a valid local security context in the IDP. The user may then request access to a SP, e.g. an SaaS application on a service provider platform, which causes the IDP's SSO service to be called. The SSO service builds a SAML assertion representing the user's logon security context, which is digitally signed and place in an SAML response message. In the case of an HTML context, the SAML response message is placed in an HTML form as a hidden form control, e.g. SAMLResponse. If the convention for identifying a specific application resource at the SP is supported at the IDP and the SP, then the resource URL at the SP can be encoded into the HTML form using a hidden form control, e.g. RelayState. The SSO service sends the HTML form to the SP in the HTTP response, which may include script code to automatically submit the form at the SP.

When the SP receives the form, the script code automatically issues an HTTP POST request to send the form to the SP's assertion consumer service. The SP's assertion consumer service obtains the SAML response message from the HTML form for processing. The digital signature on the SAML assertion is validated and the assertion contents are processed to create a local logon security context for the user at the SP. Once this is completed, the SP retrieves the RelayState data to determine the desired application resource URL and sends an HTTP redirect response to access the requested resource. An access check is made to establish whether the user has the correct authorization to access the resource. If the access check passes, then the user obtains access to the resource.

In the present approach, one proxy user is provided for multiple support users to access each tenant and access for each user is controlled through configuration in the IDP. A user to tenant mappings are maintained in IDP along with corresponding mappings in the SP. The IDP, proxy user and associated user to tenant mappings are automatically created when a tenant is added and automatically deleted when a tenant is removed. Authentication of users is performed in the IDP, the users are mapped to the proxy user, and IDP-initiated SSO is utilized to give the support users access to the SP for the tenant.

Figure 5:
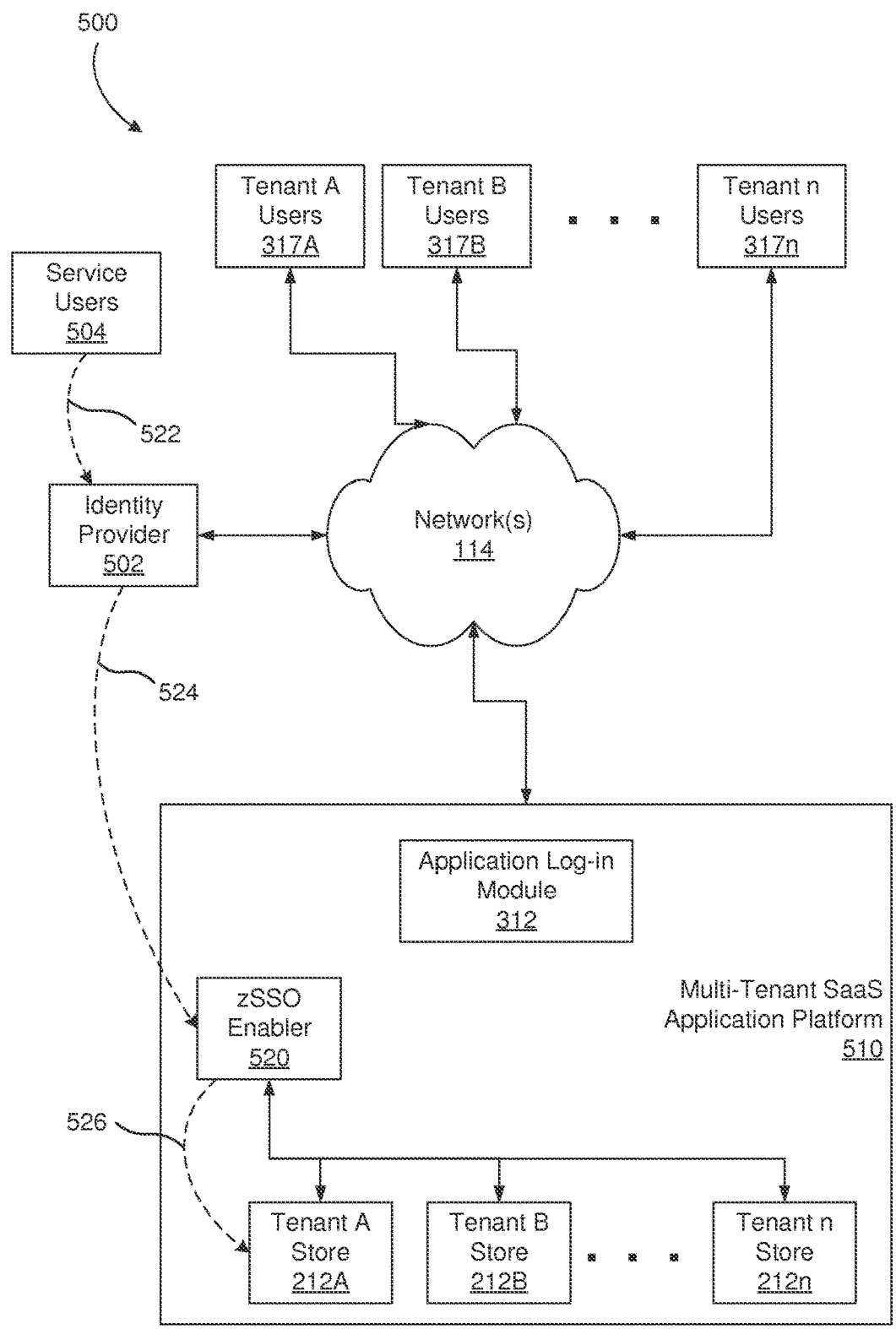
FIG. 5 is a diagram illustrating elements of an example of the current sign-on process, referred to as "zSSO" in the figure, that may be used to enable a technical support or customer service representative of a multi-tenant service provider to access a tenant's account.

FIG. 5 is a diagram illustrating an example of the present single sign-on login approach, which is referred to as "zSSO" in the figure. In this example, the users are the service provider's internal technical or customer support employees 504, i.e. the provider of Multi-Tenant SaaS Application Platform 510. As noted above, using the conventional application direct login approach or SSO approach generally requires a user account to be provisioned for each user for each tenant, and that access control permissions need to be configured for each such user account (with the same requirements typically being maintained in production or sandbox environments). In contrast, in an example of the present approach, there is a single proxy user for all of the support employees for a tenant, and the access for each user is controlled through configuration in IDP 502. In one example, the authentication leverages an IDP 502 initiated single-sign-on process along with a user/tenant mapping on IDP 502 and corresponding mappings on the service provider's database. In some examples, the present approach dynamically creates the mappings and proxy accounts based on receiving one or more triggering events, e.g. new tenant creation, addition of new users in the system, etc. Once a tenant or user is deactivated, the examples of the present process dynamically revoke access privileges for those entities.

In FIG. 5, Service User 504 sends a login request 522 to IDP 502, which authenticates the user. IDP 502 references the user/tenant mapping to limit the user's access to the corresponding Tenant Store 212A, 212B and 212n in database of SaaS Platform 510 or elsewhere in the service provider's infrastructure, e.g. remote databases. The user request with access controls 524 is forwarded via secure link to zSSO Enabler 520, which permits access 526 to Tenant Store 212A, 212B and 212n based on the access controls.

Figure 6:
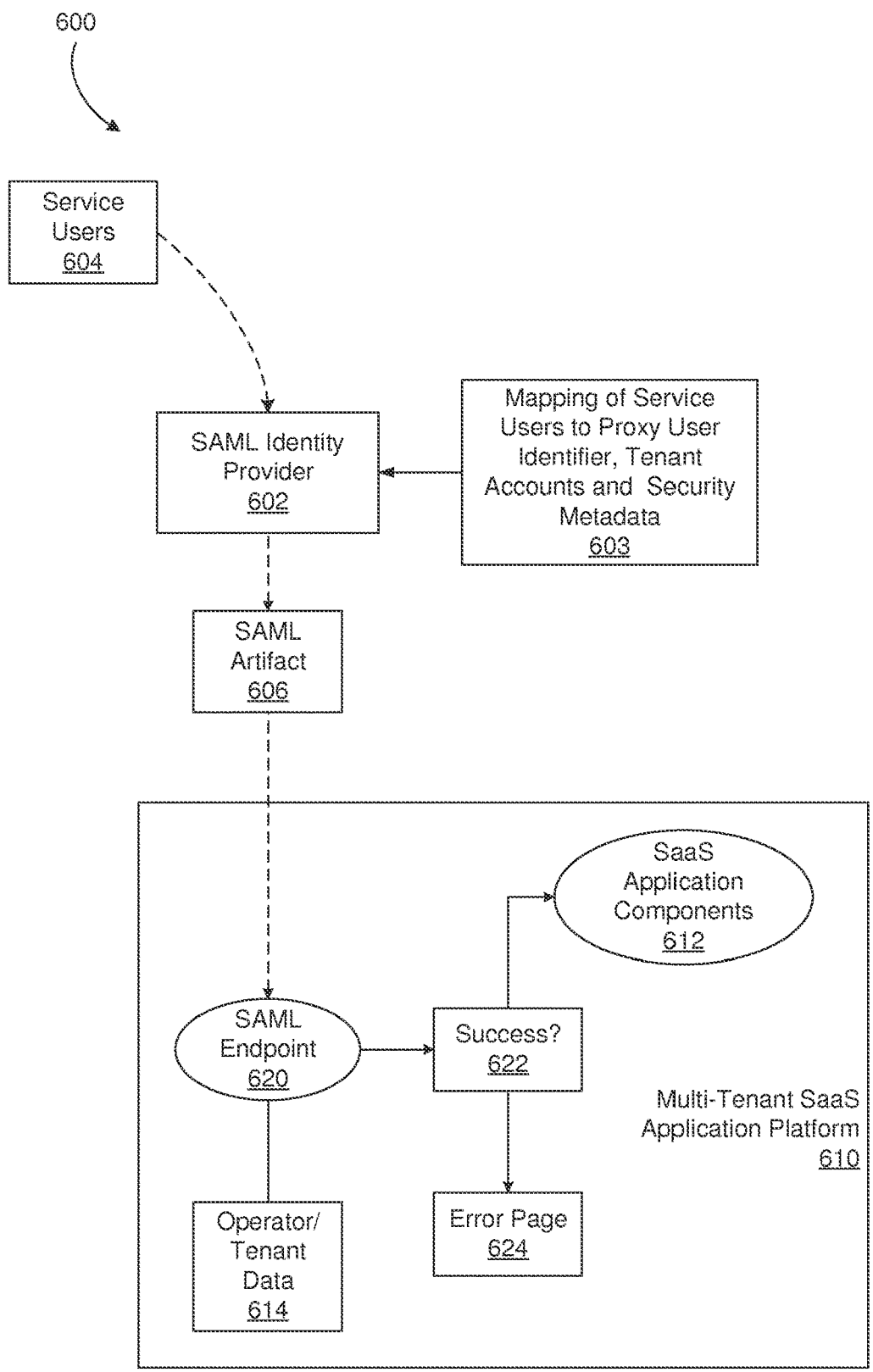
FIG. 6 is a diagram illustrating an example data flow for use in enabling a technical support or customer service representative of a multi-tenant service provider to access a tenant's account, and that may be implemented in accordance with an example of the invention.

FIG. 6 is a diagram illustrating an example data flow 600 for use in enabling a technical support representative of a multi-tenant service provider to access a tenant's account, and that may be implemented in accordance with examples of the invention. As shown in the example of FIG. 6, a technical support representative 604 of the operator of a multi-tenant platform 610, e.g. Service Provider or Platform, logs into a Security Assertion Markup Language (SAML) Identity Provider 602. SAML Identity Provider 602 authenticates the technical support representative 604, e.g. user name and password, to establish the security context for the technical support representative 604. SAML Identity Provider 602 accesses a mapping 603 of authorized service users for a tenant account that maps the authorized service users to a proxy user identifier for the tenant account along with security metadata for the proxy user identifier and, if a mapping is found, produces SAML Artifact 606, which includes the proxy user identifier and security metadata. SAML Artifact 606 is transferred to SAML Endpoint application 620 in Multi-Tenant SaaS Application Platform 610 when service user 604 requests access to the tenant account on SaaS Platform 610.

In SaaS Platform 610, Operator/Tenant Database 614 includes one or more associations between proxy user identifiers and tenants of the platform. Upon receiving the SAML Artifact 606, SAML Endpoint application 620 uses the mapping information from Operator/Tenant Database 614 to validate/confirm that the proxy user identifier and security metadata passed in the SAML Artifact 606 is registered in the platform 610 and is associated with the particular tenant account that the technical support representative 604 is attempting log into. Upon successful validation, technical support representative 604 gets access to the tenant's SaaS Application Components 612 on SaaS Platform 610. If validation of SAML Artifact 606 fails, e.g. unable to validate or confirm the username, the technical support user is redirected to Error Page 624. The failure to validate or confirm prevents direct access of the support user 604 to the tenant's account in SaaS 610.

Note that, in this approach, there is no direct access from Service User 604 to the Tenant data and accounts on SaaS Application platform 610. Access to Tenant data comes through SAML IDP 602 and SAML Endpoint 620, which improves security by removing the need for direct access to Tenant data.

Figure 7:
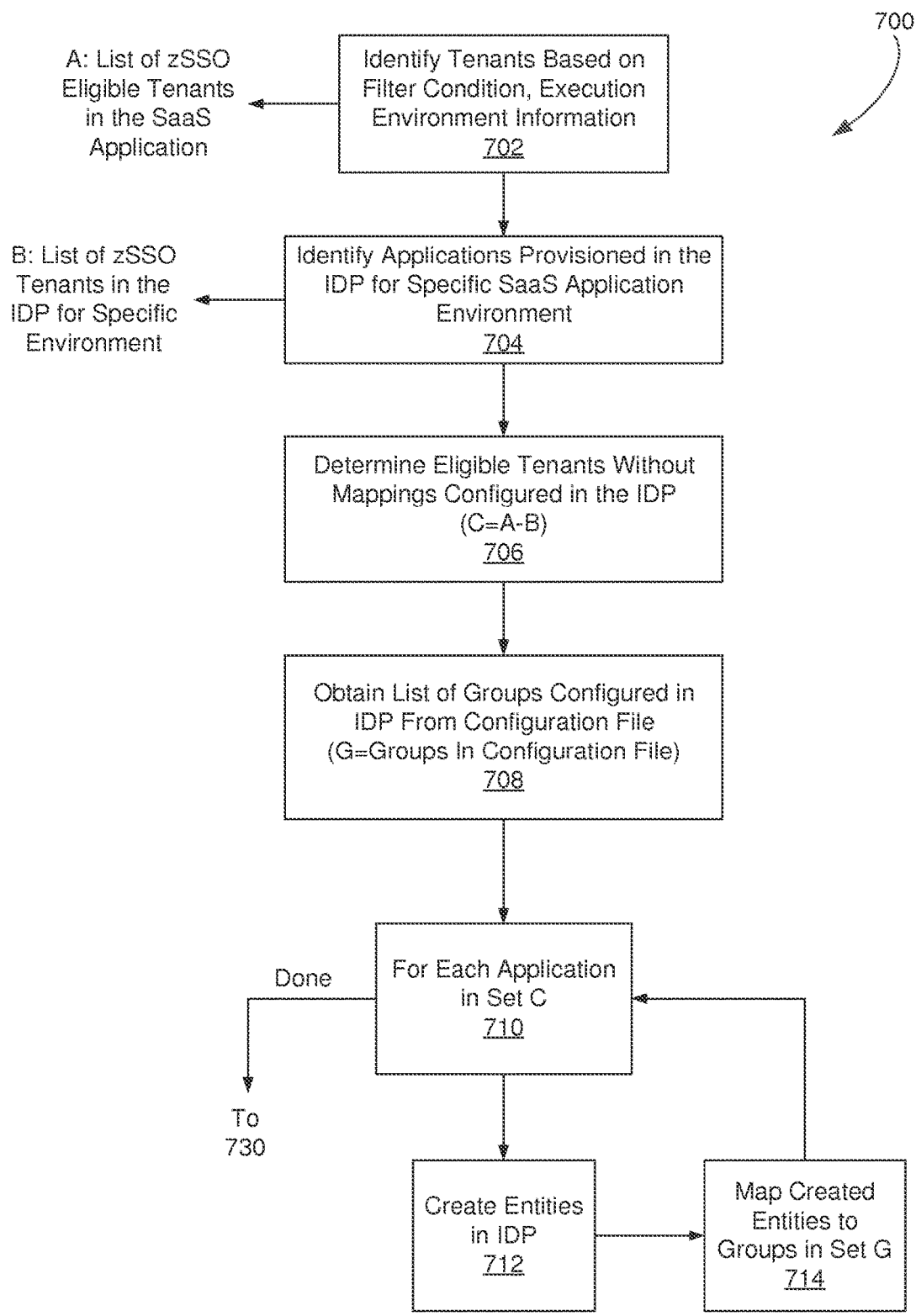
FIG. 7 is a flow chart or flow diagram illustrating a method, process, function, or operation that may be used to enable a technical support representative of a multi-tenant service provider to access a tenant's account, and that may be implemented in accordance with an example of the invention.

FIG. 7 is a flow chart or flow diagram illustrating a method, process, function, or operation 700 that may be automatically triggered when, for example, a tenant is added or user added in order to enable technical support representatives of a multi-tenant service provider to access the tenant's account, and that may be implemented in accordance with an embodiment of the invention. At step 702, Set A of zSSO Eligible Tenants on SaaS Application Platform 610 is identified based on filter conditions and execution environment information. Note that different SaaS providers may have different criteria to identify eligible tenants, which typically includes only active tenants. At step 704, Set B of zSSO Tenant Applications provisioned for a specific SaaS application environment, such as Production, SandBox, etc., is identified from SAML Identity Provider 602.

At step 706, a determination is made of the eligible tenants without tenant mappings configured in IDP 602 to obtain Set C, where Set C=Set A−Set B. Set C is the Tenants that are eligible, but do not have an Application provisioned in the Identity Provider. At step 708, the system obtains Set G, which is a list of groups of users and Tenant Applications configured in Identity Provider 602 from a zSSO Configuration file, such as a config.properties file.

For example, an SSO administrator is defined for each specific affiliate SaaS application who manages the application; creates, deletes and manages mappings; and sets credentials, which are stored in the IDP in encrypted form. The SSO administrator defines the group of users that can access a specific SaaS application with the appropriate credentials and creates SSO credential mappings of the users in the group for a specific affiliate SaaS application. When an SSO administrator configures an end point, e.g. a send port or receive location, the SSO system creates a mapping for a unique identifier and the configuration properties or values for that end point, which are stored in encrypted form in a credential database in IDP 602.

At step 710, for each application in Set C, an entity is created for each Tenant Application in IDP 602, step 712, and the entity is mapped to the groups of users in Set G, step 714. When this mapping is completed for each application in Set C, control branches to step 730.

Figure 8:
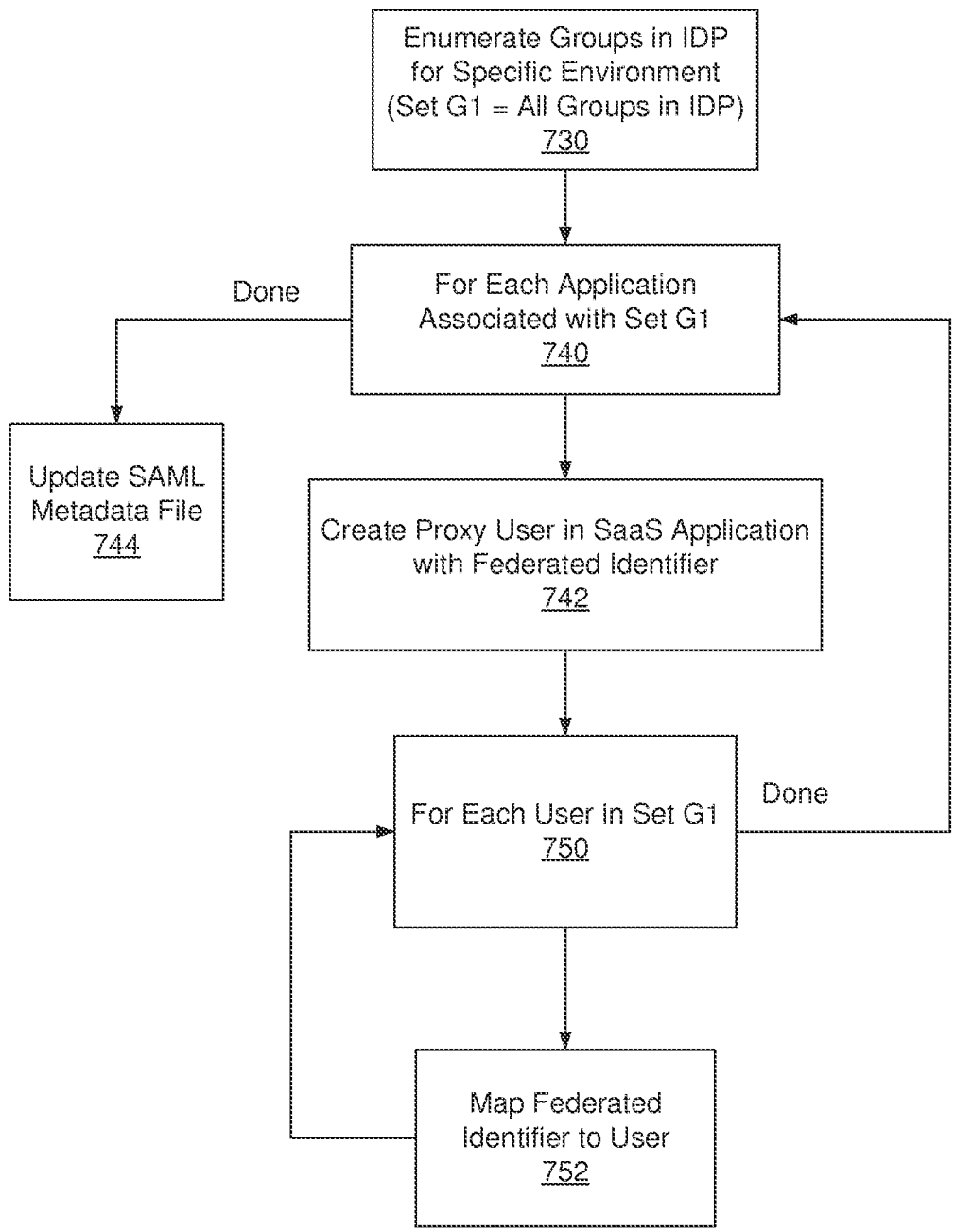
FIG. 8 is a flow chart or flow diagram further illustrating the method, process, function, or operation of FIG. 7.

At step 730, in FIG. 8, Set G1 of all the groups in IDP 602 is created by enumerating the groups in IDP 602 for the specific environment. At step 740, for each application in Set G1, SAML metadata is provisioned in Operator/Tenant Data Store 614 on SaaS Application Platform 610. This is done by creating a proxy user in SaaS Application Platform 610 for each Tenant Application, step 742. At step 750, for each user in Set G1, Federated Identifier is mapped to the Proxy User, if not already mapped. One each user in Set G1 has been mapped to the Proxy User for the application and this has been performed for each application associated with Set G1, then an updated SAML metadata file is stored in Operator Tenant Store 614, at step 744.

Figure 9:
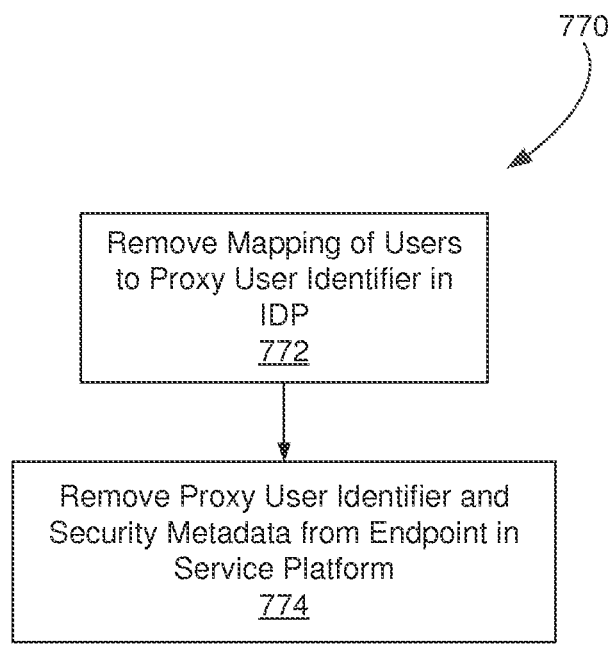
FIG. 9 is a flow chart or flow diagram illustrating a method, process, function, or operation that may be used to disable technical support access for technical support representatives of a multi-tenant service provider when a tenant's account is deleted, and that may be implemented in accordance with an example of the invention.

FIG. 9 is a flow chart or flow diagram illustrating an example of a method, process, function, or operation 770 that may be used to disable technical support access for technical support representatives of a multi-tenant service provider when, for example, a tenant's account or a user is deactivated, such as in Lightweight Directory Access Protocol (LDAP), Active Directory or the configuration of the IDP. Process 770 may be triggered, for example, when a tenant's account is deleted or to disable support user access to the tenant's account or data. At step 772, the proxy user identifier and associated user mappings and security metadata are deleted in the IDP 602. The IDP itself may be deleted in some examples. At step 774, the data for the proxy user identifier and security metadata in data store 614 is deleted in Service Platform 610. In some examples, the security endpoint 620 may be deleted as well. This effectively terminates access by service users to the tenants account, application components, and data.

The benefits of this approach may include one or more of the following: A service user may access a tenant SaaS application securely and conveniently without creating individual local accounts for each tenant account. Multiple service users may be permitted to access the same tenant account for a SaaS application at the same time. Access to tenant accounts on a SaaS platform may be provided for service users without modifying local user accounts. Mapping of multiple unique identifies to a single tenant proxy user account with unique authentication, authorization and access control for each identity. Enforce access restrictions based on the validation of an incoming assertion or access request with metadata, the service user authentication type and unique identity. No sharing of service users user accounts, which permits an audit trail tied to each service user account.

As described herein, embodiments of the invention provide a more efficient and scalable way to enable a platform operator's technical support representatives to access and interact with tenant accounts. As noted, the relative advantages of such embodiments may be understood by comparing conventional access approaches to that of an example of the invention. For example, in a multi-tenant architecture, conventional approaches to managing tenants are:

1. Creating a local Service Provider user account in each tenant instance and accessing it using an appropriate username/password. In this case, there will be Service Provider user account for each tenant. Limitations of this approach are: a) it is not a secure way to access tenants since shared credentials are used by all support members; b) there is no audit trail on which support member accessed the tenant; c) If Service Provider users are terminated, they have the knowledge of the credentials; and d) it is difficult to expire/rotate credentials; and 2. Tenant Management application used to auto-generate temporary credentials in each tenant instance, with those credentials generated at the time of access. Limitations of this approach are: a) it is not a secure way to access tenants, since these are system generated credentials and the developer has knowledge of how they are generated; b) there is no audit trail on which Service Provider user accessed the tenant; and c) the Local Service Provider temporary accounts are continuously created and deleted, and thus does not provide customers a predefined list of Service Provider users who have authorized access.

In contrast, an example of the present single-sign-on access method approach provides single-sign-on support user access to tenants in a multi-tenant architecture, thereby allowing Service Provider users to access a tenant account/application securely with SSO. Among other features, examples of the present architecture and methods may include and provide some of the following:

1) SSO access to tenant application in SaaS based multi-tenant Service Provider platform without creating individual local accounts on tenant;

2) Service Provider's users accessing the same tenant application at same time;

3) Service Provider's users accessing multiple tenant application at same time;

4) Adding access to new Service Provider's users to tenant application without modifying local user accounts;

5) Mapping of multiple unique identities to a single tenant proxy user account, with unique authentication, authorization and access control for each identity;

6) Enforce access restrictions based on the validation of incoming assertion with metadata, Service Provider's authentication type and unique identity;

7) No concept of sharing of Service Provider user accounts; and

8) Audit trail is tied to Service Provider users (not to a shared account).

In general, an embodiment of the invention may be used in conjunction with (or implemented as) a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

Note that each user interface (such as elements 117 of FIG. 1) may include one or more interface elements. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer (such as element 120 of FIG. 1, or applications installed on server elements 122) may include one or more application modules, each having one or more sub-modules. Each application module or sub-module may correspond to a particular function, method, process, or operation that is implemented by the module or sub-module (e.g., a function or process related to providing ERP, CRM, eCommerce, financial accounting, revenue recognition, or other functionality to a user/tenant of the platform). Such function, method, process, or operation may also include those used to implement one or more aspects of the present system and methods, such as for:

Enabling use of a single-sign-on process for multiple technical support representatives, and access provided to one or more tenant accounts; or Performing creation of proxy accounts and configuration of an authentication function or operation in response to one or more triggering events.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 122 of FIG. 1) may include each application module. Alternatively, different application servers may include different sets of application modules. Such sets may be disjoint or overlapping.

A data storage layer (such as element 124 of FIG. 1, or elements of datastores 125 or 126) may include one or more data objects, each having one or more data object components, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-5 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Although further examples below may reference the example computing environment depicted in FIGS. 1-5, it will be apparent to one of skill in the art that the examples may be adapted for alternate computing devices, systems, apparatuses, processes, and environments.

Figure 10:
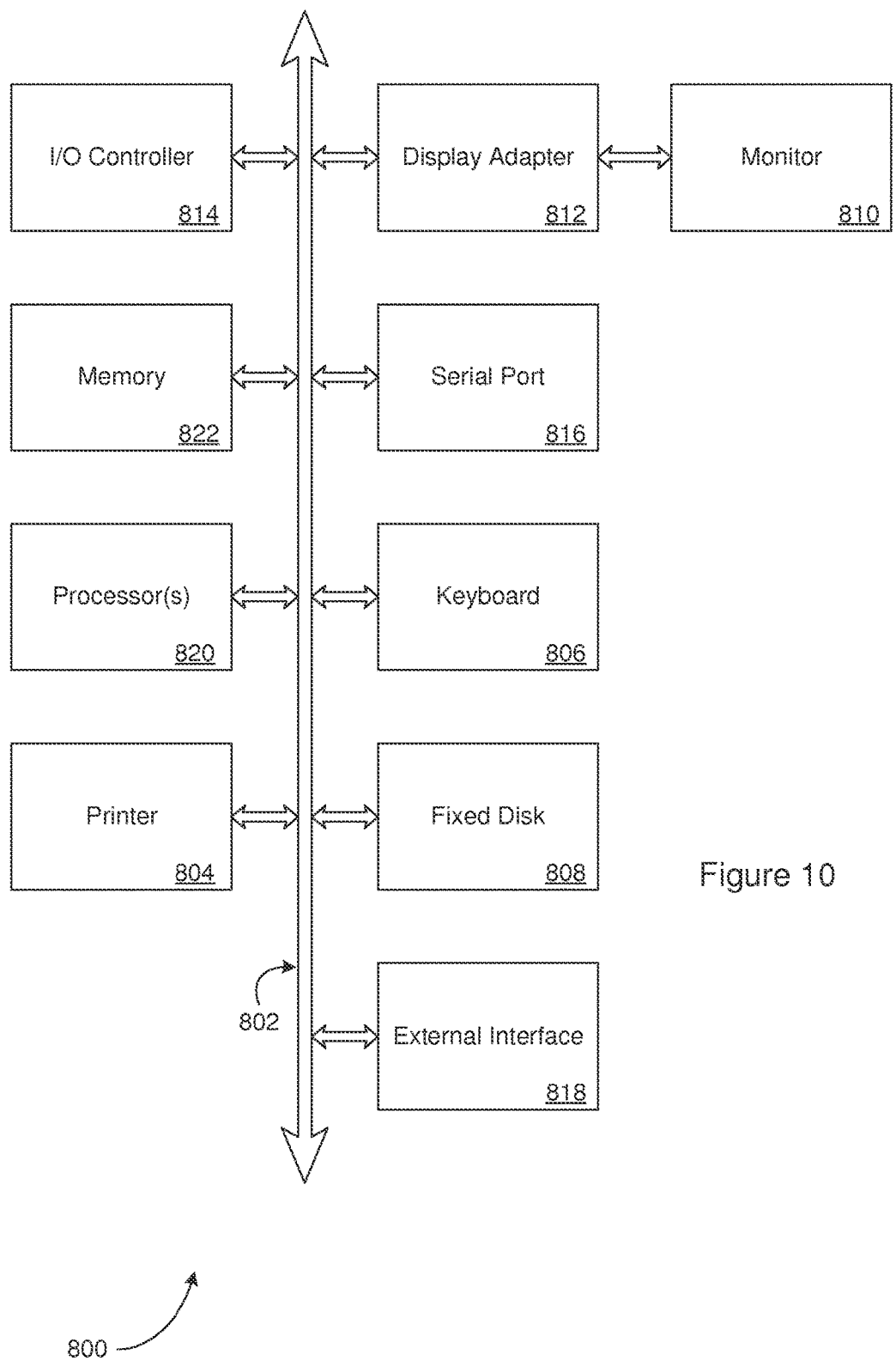
FIG. 10 is a diagram illustrating elements or components that may be present in a computer device or system configured to implement a method, process, function, or operation in accordance with an example of the invention.

In accordance with one embodiment of the invention, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 10 is a diagram illustrating elements or components that may be present in a computer device or system 800 configured to implement a method, process, function, or operation in accordance with an embodiment of the invention. The subsystems shown in FIG. 10 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 10 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method for single sign-on support access to tenant systems on a multi-tenant service platform, the method including the steps of:

providing a plurality of proxy user account identifiers in an identity provider module, each proxy user account identifier of the plurality of proxy user account identifiers configured to assist in identifying a proxy user account configured to assist in accessing a respective tenant system of a plurality of tenant systems on a multi-tenant service platform, each proxy user account identifier of the plurality of proxy user account identifiers having corresponding security metadata associated therewith in the identity provider module, the corresponding security metadata configured to enable a corresponding proxy user account to access a corresponding respective tenant system, a particular proxy user account identifier identifying a particular proxy user account of the plurality of proxy user accounts that is configured to assist in accessing a particular tenant system of the plurality of tenant systems, the particular proxy user account of the plurality of proxy user accounts being dynamically created and configured in response to one or more first trigger events, the one or more first trigger events including the addition of the particular tenant system of the plurality of tenant systems to the multi-tenant service platform;

providing mappings in the identity provider module that map a plurality of support user accounts to the plurality of proxy user account identifiers, at least one first particular mapping of the mappings in the identity provider module mapping a first particular support user account of the plurality of support user accounts to the particular proxy user account identifier, the at least one first particular mapping of the mappings being dynamically mapped in the identity provider module in response to the one or more first trigger events, at least one second particular mapping of the mappings in the identity provider module mapping a second particular support user account of the plurality of support user accounts to a subset of the plurality of proxy user account identifiers, the subset of the plurality of proxy user account identifiers including the particular proxy user account identifier and including less than all of the proxy user account identifiers;

using a security endpoint module in the multi-tenant service platform to assist in connecting each proxy user account of the plurality of proxy user accounts to the respective tenant system of the plurality of tenant systems, the security endpoint module including a mapping that maps each proxy user account of the plurality of proxy user accounts to the respective tenant system of the plurality of tenant systems;

in the identity provider module:
  receiving from the second particular support user account a request to access the particular tenant system,
  authenticating a second particular support user of the second particular support user account,
  confirming that the second particular support user account is authorized to access the particular tenant system by confirming that the second particular support user account is mapped to a particular tenant system identifier associated with the particular tenant system, and
  if the second particular support user is authenticated and authorized, sending a security assertion with the particular proxy user account identifier and the corresponding security metadata to the security endpoint module in response to the request; and in the security endpoint module:
  receiving the security assertion, the particular proxy user account identifier, and the corresponding security metadata for the second particular support user,
  using the particular proxy user account identifier to identify the particular proxy user account,
  using the particular proxy user account and the corresponding security metadata to enable the second particular support user to access the particular tenant system of the plurality of tenant systems without disclosing the corresponding security metadata to the second particular support user, and without allowing the second particular support user to access other tenant systems of the plurality of tenant systems in response to the request,
  separately tracking activity of the second particular support user, and
  removing at least a portion of the mappings and at least a portion of the security metadata in the identity provider module, the at least a portion of the mappings and the at least a portion of the security metadata corresponding to the second particular support user, the at least a portion of the mappings and the at least a portion of the security metadata being dynamically removed in response to one or more second trigger events, the one or more second trigger events including deactivating the second particular support user account.

2. The method of claim 1, further comprising:
in the identity provider module:
  receiving from an other support user account of the plurality of support user accounts a request to access the particular tenant system on the multi-tenant service platform,
  authenticating an other support user of the other support user account, and
  sending an other security assertion with the particular proxy user account identifier and the corresponding security metadata to the security endpoint module in response to the request; and
in the security endpoint module:
  receiving the other security assertion and the particular proxy user account identifier for the other support user account,
  using the particular proxy user account identifier to identify the particular proxy user account, and
  using the particular proxy user account and the corresponding security metadata to enable the other support user to access the particular tenant system of the plurality of tenant systems without disclosing the corresponding security metadata to the other support user, and without allowing the other support user to access other tenant systems of the plurality of tenant systems in response to the request.

3. The method of claim 1, wherein the providing the mappings in the identity provider module that map the plurality of support user accounts to the plurality of proxy user identifiers, and the providing the mapping in the security endpoint module that maps each proxy user account of the plurality of proxy user accounts to the respective tenant system of the plurality of tenant systems, comprise:
  determining eligible tenant systems without mappings configured in the identity provider module;
  obtaining a list of support users for the tenant system configured in a configuration file of the identity provider module; and
  for each tenant system without a mapping configured:
    creating a mapping entity for the tenant system,
    mapping the created entity to the list of support users for the tenant system,
    creating a proxy user account for the tenant system with a federated identifier,
    mapping each support user in the list of support users to the federated identifier, and
    creating the corresponding security metadata for the proxy user account.

4. The method of claim 3, wherein the providing the mappings in the identity provider module and the security endpoint module takes place in response to at least one of an addition of a tenant system to the plurality of tenant systems and an addition of a support user account to the plurality of support user accounts.

5. The method of claim 1, wherein, responsive to deactivation of a certain tenant system, the method further includes at least one of the steps of:
- disabling support access to the certain tenant system by removing the mappings in the identity provider module that map at least one certain support user account to a certain proxy user account identifier; and
- removing the mapping in the security endpoint module that maps the certain proxy user account to the certain tenant system.

6. The method of claim 1, wherein, responsive to deactivation of a certain support user account, the deactivated certain support user account is removed from the mappings in the identity provider module.

7. A system for single sign-on support access to tenant systems on a multi-tenant service platform, the system including:
- at least one hardware processor;
- an identity provider module with a plurality of proxy user account identifiers, each proxy user account identifier of the plurality of proxy user account identifiers configured to assist in identifying a proxy user account configured to assist in accessing a respective tenant system of a plurality of tenant systems on a multi-tenant service platform, each proxy user account identifier of the plurality of proxy user account identifiers having corresponding security metadata associated therewith in the identity provider module, the corresponding security metadata configured to enable a corresponding proxy user account to access a corresponding respective tenant system, a particular proxy user account identifier identifying a particular proxy user account of the plurality of proxy user accounts that is configured to assist in accessing a particular tenant system of the plurality of tenant systems, the particular proxy user account of the plurality of proxy user accounts being dynamically created and configured in response to one or more first trigger events, the one or more first trigger events including the addition of the particular tenant system of the plurality of tenant systems to the multi-tenant service platform;
- mappings in the identity provider module that map a plurality of support user accounts to the plurality of proxy user account identifiers, at least one first particular mapping of the mappings in the identity provider module mapping a first particular support user account of the plurality of support user accounts to the particular proxy user account identifier, the at least one first particular mapping of the mappings being dynamically mapped in the identity provider module in response to the one or more first trigger events, at least one second particular mapping of the mappings in the identity provider module mapping a second particular support user account of the plurality of support user accounts to a subset of the plurality of proxy user account identifiers, the subset of the plurality of proxy user account identifiers including the particular proxy user account identifier and including less than all of the proxy user account identifiers;
- a security endpoint module in the multi-tenant service platform, the security endpoint module configured to assist in connecting each proxy user account of the plurality of proxy user accounts to the respective tenant system of the plurality of tenant systems, the security endpoint module including a mapping that maps each proxy user account of the plurality of proxy user accounts to the respective tenant system of the plurality of tenant systems;

wherein the identity provider module is configured to:
- receive from the second particular support user account a request to access the particular tenant system,
- authenticate a second particular support user of the second particular support user account,
- confirm that the second particular support user account is authorized to access the particular tenant system by confirming that the second particular support user account is mapped to a particular tenant system identifier associated with the particular tenant system, and
- if the second particular support user is authenticated and authorized, send a security assertion with the particular proxy user account identifier and the corresponding security metadata to the security endpoint module in response to the request; and wherein the security endpoint module is configured to:
- receive the security assertion, the particular proxy user account identifier, and the corresponding security metadata for the second particular support user,
- use the particular proxy user account identifier to identify the particular proxy user account,
- use the particular proxy user account and the corresponding security metadata to enable the second particular support user to access the particular tenant system of the plurality of tenant systems without disclosing the corresponding security metadata to the second particular support user, and without allowing the second particular support user to access other tenant systems of the plurality of tenant systems in response to the request,
- separately track activity of the second particular support user, and
- remove at least a portion of the mappings and at least a portion of the security metadata in the identity provider module, the at least a portion of the mappings and the at least a portion of the security metadata corresponding to the second particular support user, the at least a portion of the mappings and the at least a portion of the security metadata being dynamically removed in response to one or more second trigger events, the one or more second trigger events including deactivation of the second particular support user account.

8. The system of claim 7, wherein:
the identity provider module is further configured to:
- receive from an other support user account of the plurality of support user accounts a request to access the particular tenant system on the multi-tenant service platform,
- authenticate an other support user of the other support user account, and
- send an other security assertion with the particular proxy user account identifier and the corresponding security metadata to the security endpoint module in response to the request; and the security endpoint module is further configured to:
- receive the other security assertion and the particular proxy user account identifier for the other support user account, use the particular proxy user account identifier to identify the particular proxy user account, and use the particular proxy user account and the corresponding security metadata to enable the other support user to access the particular tenant system of the plurality of tenant systems without disclosing the corresponding security metadata to the other support user, and without allowing the other support user to access other tenant systems of the plurality of tenant systems in response to the request.

9. The system of claim 7, further comprising a module for providing the mappings in the identity provider module that map the plurality of support user accounts to the plurality of proxy user identifiers, and for providing the mapping in the security endpoint module that maps each proxy user account of the plurality of proxy user accounts to the respective tenant system of the plurality of tenant systems, wherein the providing the mappings comprises:

determining eligible tenant systems without mappings configured in the identity provider module;

obtaining a list of support users for the tenant system configured in a configuration file of the identity provider module; and for each tenant system without a mapping configured:
creating a mapping entity for the tenant system,
mapping the created entity to the list of support users for the tenant system,
creating a proxy user account for the tenant system with a federated identifier,
mapping each support user in the list of support users to the federated identifier, and
creating the corresponding security metadata for the proxy user account.

10. The system of claim 9, wherein the module for providing the mappings in the identity provider module and the security endpoint module is configured to provide the mappings in response to at least one of an addition of a tenant system to the plurality of tenant systems and an addition of a support user account to the plurality of support user accounts.

11. The system of claim 7, further comprising a module configured to respond to deactivation of a certain tenant system by:

disabling support access to the certain tenant system by removing the mappings in the identity provider module that map at least one certain support user account to a certain proxy user account identifier; and removing the mapping in the security endpoint module that maps the certain proxy user account to the certain tenant system.

12. The system of claim 7, further comprising a module configured to respond to deactivation of a certain support user account by removing the deactivated certain support user account from the mappings in the identity provider module.

13. Non-transitory computer readable storage storing computer code configured to cause one or more processing devices to operate to provide single sign-on support access to tenant systems on a multi-tenant service platform, the computer code including instructions that configure the one or more processing devices to:

provide a plurality of proxy user account identifiers in an identity provider module, each proxy user account identifier of the plurality of proxy user account identifiers configured to assist in identifying a proxy user account configured to assist in accessing a respective tenant system of a plurality of tenant systems on a multi-tenant service platform, each proxy user account identifier of the plurality of proxy user account identifiers having corresponding security metadata associated therewith in the identity provider module, the corresponding security metadata configured to enable a corresponding proxy user account to access a corresponding respective tenant system, a particular proxy user account identifier identifying a particular proxy user account of the plurality of proxy user accounts that is configured to assist in accessing a particular tenant system of the plurality of tenant systems, the particular proxy user account of the plurality of proxy user accounts being dynamically created and configured in response to one or more first trigger events, the one or more first trigger events including the addition of the particular tenant system of the plurality of tenant systems to the multi-tenant service platform;

provide mappings in the identity provider module that map a plurality of support user accounts to the plurality of proxy user account identifiers, at least one first particular mapping of the mappings in the identity provider module mapping a first particular support user account of the plurality of support user accounts to the particular proxy user account identifier, the at least one first particular mapping of the mappings being dynamically mapped in the identity provider module in response to the one or more first trigger events, at least one second particular mapping of the mappings in the identity provider module mapping a second particular support user account of the plurality of support user accounts to a subset of the plurality of proxy user account identifiers, the subset of the plurality of proxy user account identifiers including the particular proxy user account identifier and including less than all of the proxy user account identifiers;

use a security endpoint module in the multi-tenant service platform to assist in connecting each proxy user account of the plurality of proxy user accounts to the respective tenant system of the plurality of tenant systems, the security endpoint module including a mapping that maps each proxy user account of the plurality of proxy user accounts to the respective tenant system of the plurality of tenant systems;

in the identity provider module:
receive from the second particular support user account a request to access the particular tenant system,
authenticate a second particular support user of the second particular support user account,
confirm that the second particular support user account is authorized to access the particular tenant system by confirming that the second particular support user account is mapped to a particular tenant system identifier associated with the particular tenant system, and
if the second particular support user is authenticated and authorized, send a security assertion with the particular proxy user account identifier and the corresponding security metadata to the security endpoint module in response to the request; and in the security endpoint module:
receive the security assertion, the particular proxy user account identifier, and the corresponding security metadata for the second particular support user,
use the particular proxy user account identifier to identify the particular proxy user account,
use the particular proxy user account and the corresponding security metadata to enable the second particular support user to access the particular tenant system of the plurality of tenant systems without disclosing the corresponding security metadata to the second particular support user, and without allowing the second particular support user to access other tenant systems of the plurality of tenant systems in response to the request, separately track activity of the second particular support user, and remove at least a portion of the mappings and at least a portion of the security metadata in the identity provider module, the at least a portion of the mappings and the at least a portion of the security metadata corresponding to the second particular support user, the at least a portion of the mappings and the at least a portion of the security metadata being dynamically removed in response to one or more second trigger events, the one or more second trigger events including deactivating the second particular support user account.

14. The non-transitory computer readable storage of claim 13, the computer code further including instructions that configure the one or more processing devices to:

in the identity provider module:
receive from an other support user account of the plurality of support user accounts a request to access the particular tenant system on the multi-tenant service platform,
authenticate an other support user of the other support user account, and
send an other security assertion with the particular proxy user account identifier and the corresponding security metadata to the security endpoint module in response to the request; and in the security endpoint module:
receive the other security assertion and the particular proxy user account identifier for the other support user account,
use the particular proxy user account identifier to identify the particular proxy user account, and
use the particular proxy user account and the corresponding security metadata to enable the other support user to access the particular tenant system of the plurality of tenant systems without disclosing the corresponding security metadata to the other support user, and without allowing the other support user to access other tenant systems of the plurality of tenant systems in response to the request.

15. The non-transitory computer readable storage of claim 13, wherein the computer code including instructions that configure the one or more processing devices to provide the mappings in the identity provider module that map the plurality of support user accounts to the plurality of proxy user identifiers, and to provide the mapping in the security endpoint module that maps each proxy user account of the plurality of proxy user accounts to the respective tenant system of the plurality of tenant systems comprises the computer code including instructions that configure the one or more processing devices to:

determine eligible tenant systems without mappings configured in the identity provider module;
obtain a list of support users for the tenant system configured in a configuration file of the identity provider module; and
for each tenant system without a mapping configured:
create a mapping entity for the tenant system,
map the created entity to the list of support users for the tenant system,
create a proxy user account for the tenant system with a federated identifier,
map each support user in the list of support users to the federated identifier, and
create the corresponding security metadata for the proxy user account.

16. The non-transitory computer readable storage of claim 15, wherein the computer code including instructions that configure the one or more processing devices to provide the mappings in the identity provider module and the security endpoint module comprises the computer code including instructions that configure the one or more processing devices to provide the mappings in response to at least one of an addition of a tenant system to the plurality of tenant systems and an addition of a support user account to the plurality of support user accounts.

17. The non-transitory computer readable storage of claim 13, the computer code further including instructions that configure the one or more processing devices to respond to deactivation of a certain tenant system by:

disabling support access to the certain tenant system by removing the mappings in the identity provider module that map at least one certain support user account to a certain proxy user account identifier; and
removing the mapping in the security endpoint module that maps the certain proxy user account to the certain tenant system.

18. The non-transitory computer readable storage of claim 13, the computer code further including instructions that configure the one or more processing devices to respond to deactivation of a certain support user account by removing the deactivated certain support user account from the mappings in the identity provider module.

* * * * *